United States Patent Office 3,446,540
Patented May 27, 1969

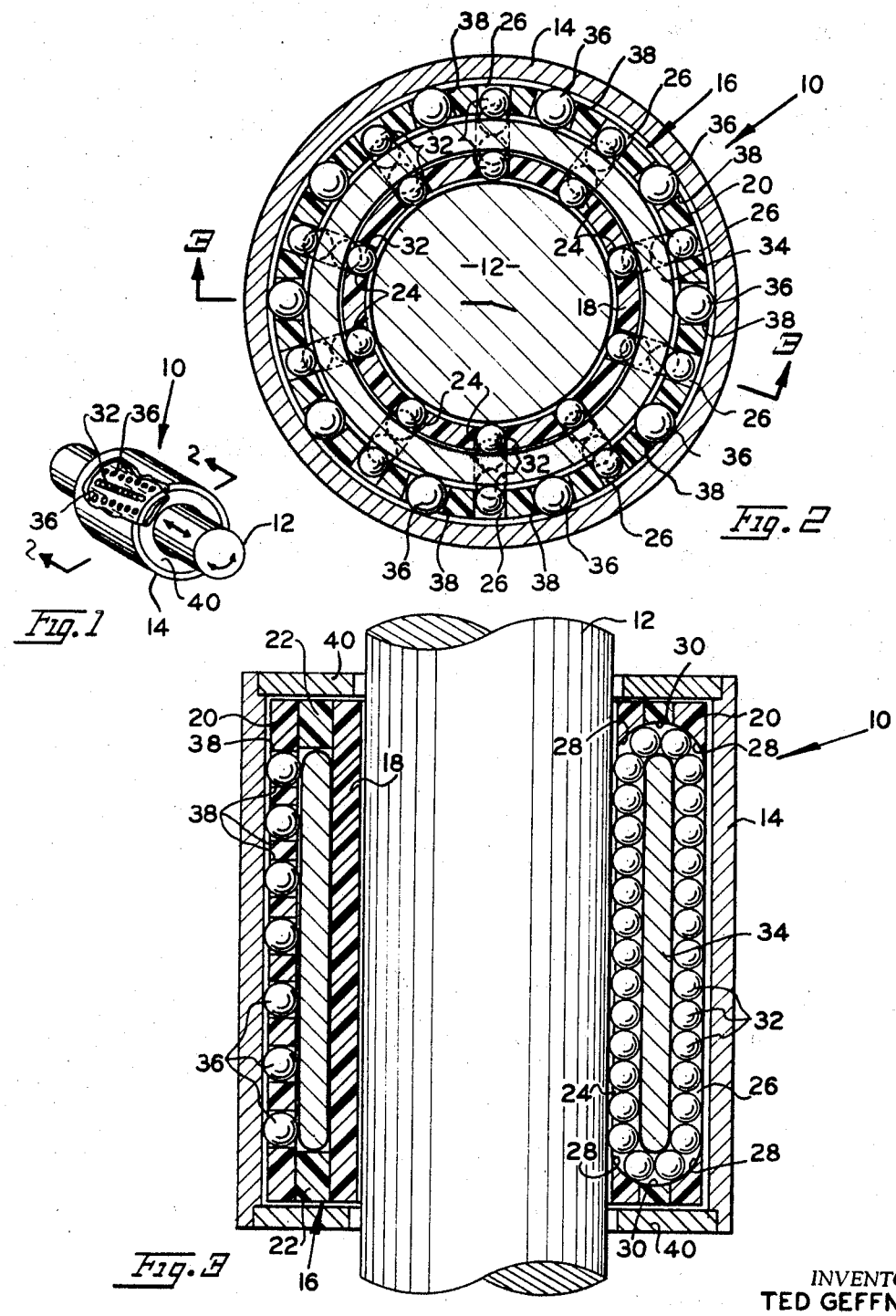

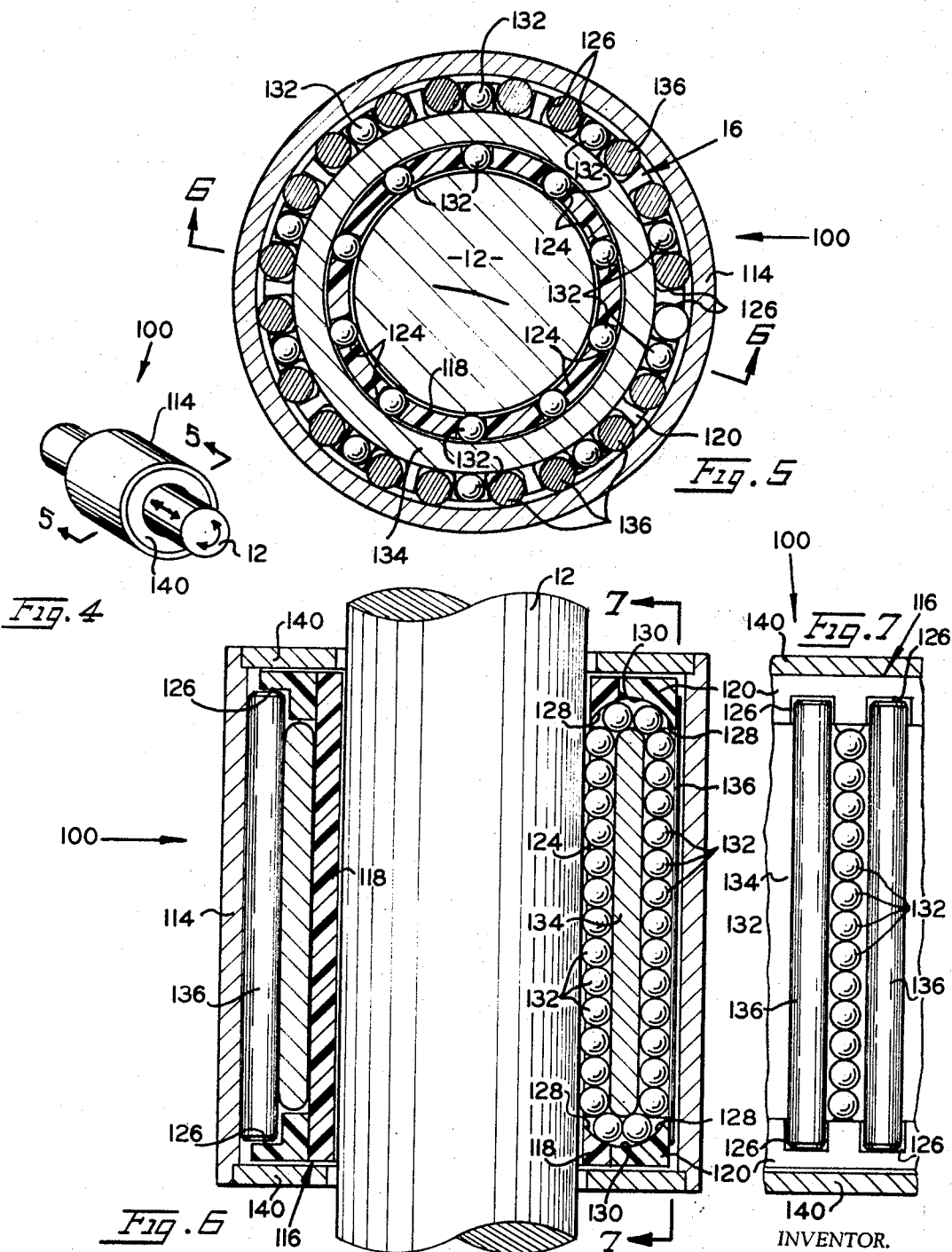

3,446,540
ANTI-FRICTION BEARINGS
Ted Geffner, 48 Park Ave. E., Merrick, N.Y. 11566
Filed Oct. 12, 1966, Ser. No. 586,151
Int. Cl. F16c *19/18, 31/06, 33/44*
U.S. Cl. 308—6                    14 Claims

ABSTRACT OF THE DISCLOSURE

Anti-friction bearings for transmitting forces between work members in which the bearing elements move in paths between active and inactive load bearing positions and a load supporting member is in load supporting engagement with the bearing elements in their active load bearing position.

---

This invention relates generally to improvements in anti-friction bearings of the type utilized to support a shaft for rotational and/or rectilinear motion.

Presently, some ball bearings of the type utilized to movably support shafts and the like are provided with a plurality of endless ball paths or circuits which the balls are adapted to traverse during load-bearing operation. However, the balls are usually retained in the individual paths by complicated ball retention devices which substantially add to the cost of such bearings. For example, one class of bearings, as exemplified by the United States Patent to Schlicksupp, Ser. No. 2,451,359, utilizes a series of indentations on the bearing sleeve to retain the balls in place. Accordingly, this operation necessitates expensive manufacturing techiques on the part of the manufacturer. Moreover, the ball elements which support the load continuously traverse and bear against the same surfaces until they eventually wear a groove in the surfaces thereby materially shortening the life of the bearing and rendering it unfit for its intended use.

Accordingly, the desideratum of the invention is to provide a bearing that may be utilized between load applying or supporting workpieces having relative linear or rotary motion.

Another object of the invention is to provide a bearing that is simple in construction wherein relative parts thereof that might be expensive and difficult to make in prior art structures may be fabricated from inexpensive plastic materials thereby resulting in a substantial reduction in manufacturing costs.

Another object of the invention is to provide a bearing in which anti-friction bearing elements may move from load bearing to non-load bearing positions during operation and in which the loads supported thereby are continually transferred to a moving structure such that the load supporting surfaces are ever changing during operation. Hence, a further object and feature of the invention resides in the provision of a bearing in which the relative positions of load supporting parts changes such as to distribute the loads more equally thereover than in prior art bearings. This results in the provision of a relatively longer lasting bearing than has heretofore been known.

Other and further objects of this invention reside in the structures and arrangements hereinafter more fully described with reference to the accompanying drawings in which:

FIG. 1 is a perspective view, to reduced scale and with parts broken away, of a modified embodiment of an anti-friction bearing constructed in accordance with the present invention, FIG. 2 is a vertical sectional view thereof taken along line 2—2 of FIG. 1, FIG. 3 is a sectional view of the bearing taken along line 3—3 of FIG. 2, FIG. 4 is a perspective view, to reduced scale, of a bearing constructed in accordance with the present invention, showing the bearing supporting a shaft for rotatable and rectilinear movement, FIG. 5 is a vertical sectional view thereof taken along the line 5—5 of FIG. 4, FIG. 6 is a sectional view taken thereof along line 6—6 of FIG. 5, and FIG. 7 is a sectional view of the bearing shown in FIG. 6, with parts broken away to clarify the construction of the bearing, taken along line 7—7 of FIG. 6.

Referring now to FIGS. 1–3 of the drawings, the bearing structure there shown is generally identified by the numeral 10. The bearing 10 is adapted to be positioned between a plurality of relatively spaced and movable workpieces one of which may be a shaft 12 and the other of which may be the outer sleeve or load bearing member 14. As the description proceeds, it will be clear to those skilled in the art that the outer sleeve 14 may form a working integral part of the bearing 10 or it may be a second workpiece that is spaced from and movable relative to the shaft 12.

The bearing 10 includes a carrier member generally identified by the numeral 16 which occupies substantially the space between the shaft 12 and the outer sleeve load bearing member 14. The carrier is formed by an inner race sleeve 18, a race return sleeve 20 and end spacer caps 22. The whole carrier 16 forms a unitary rotatable member with the sleeves 18 and 20 connected together spaced from each other at their opposite longitudinal ends by the caps 22.

To better understand the construction of the carrier 16, it will be seen that the sleeves 18 and 20 shown in FIGS. 2 and 3 have radially aligned parallel elongated raceway slots 24 and 26 respectively. These terminate in smooth curves 28 directed toward each other at their opposite ends and merge with a smooth curve 30 defined in each of the end caps 22. The combined slots 24 and 26 and the smooth curved ends 28 and 30 define an endless track or raceway which is adapted to retain and guide rollable load bearing elements such as spherical ball bearings 32 for movement therein and therealong.

The slot 24 is narrowed or tapered at the radial innercost surface of the sleeve 18 to a dimension less than the diameter of the balls 32 to prevent the loss or radial passage of the same therethrough as can be seen in FIG. 2. This enables the rapid and easy assembly of the bearing elements 32 in the raceway through the slot 26 in the sleeve 20. Although only one such raceway has been described, it will be seen that there are a plurality of them spaced circumferentially about the carrier 16 to position the bearing elements 32 therein in engagement with the shaft workpiece 12.

The elongated circularly extending hollow formed in the carrier 16 between the sleeves 18 and 20 and end caps 22 is occupied by an intermediate idler sleeve or load transfer member 34. The member 34 is cylindrical rounded at its opposite ends to conform to the rounded ends 28 and 30 of the carrier raceways to complete the configuration of the same. Because of its circular shape, the member 34 extends through each of the plurality of raceways formed in the carrier 16. Furthermore, because it is disconnected from the carrier, it is free to rotate relative to the carrier 16, its raceways and the bearing elements 32 therein.

Mounted in load bearing engagement between the outer surface of the sleeve member 34 and the facing inner surface of the outer member 14 are a second set of rollable load bearing elements 36. The load bearing elements 36 are in constant load bearing engagement between the aforementioned surfaces to retain the same spaced from each other and to transfer a load from one to the other by rolling motion therebetween. In the present embodiment, the bearing elements 36 are illustrated in the form of spherical ball bearings of larger diameter than that of the first set of bearing elements 32.

The bearing elements 36 are caged in longitudinal and circumferential relative spaced relation in the space between the members 14 and 34 by the carrier 16 and, more specifically, by the race return sleeve 20. In this connection, the sleeve 20 is provided with a plurality of caging apertures 38, one for each element 36. The apertures 38 are spaced in rows circumferentially about the sleeve 20 intersticed between the raceway slots 26. Hence between adjacent raceways for the bearing elements 32 there is a row of bearing elements 36 of larger diameter.

It should be clear from what has been described that the space between the facing surfaces of the members 14 and 34 is greater than the diameter of the bearing elements 32 positioned in the raceway slots 26 and between the same surfaces. In consequence, the bearing elements 32 positioned within the confines of the raceway slots 26 are freely movable and, therefore, non-load bearing. On the other hand, the elements 32 positioned in the slots 24 are in load bearing engagement between the shaft 12 and the member 34.

If the outer sleeve 14 forms an integral working part of the bearing 10 in its assembled construction, it functions as an outer closure or housing for the same. This housing is completed by the provision of end rings 40 that may be secured to the sleeve in any convenient manner. The end housing rings 40 will have central openings of sufficient diameter as to facilitate the application of the bearing 10 about the shaft workpiece 12.

In practice, the bearing 10 may be positioned between two relatively movable workpieces, one of which may be the shaft 12 and another to be mounted on the sleeve 14. Such workpieces may have relative rectilinear as well as rotary motion as shown by the arrows in FIG. 1. During such relative movement, the two sets of load bearing elements 32 and 36 will engage opposite surfaces of the idler load transfer member 34. The elements 32 engage the member 34 will also be in load bearing engagement with the shaft 12 while the elements 36 will be in engagement with the load supporting sleeve 14. This arrangement positions the member 34 between the two relatively spaced loads of the workpieces thereby affording it the function of a load transfer medium.

During the relative motion of the workpieces, the bearing elements 32 engage between the shaft 12 and sleeve 34 rotate. Their rotation is, of course, guided by the confines of their raceways. Therefore, as they move in their raceways, they traverse the track of their raceways, moving from their load bearing positions to their non-load bearing positions (slots 26) where they have free movement. As they rotate, the elements 32 present changing bearing surfaces and different elements 32 for load bearing engagement with the shaft 12 and sleeve 34. This results in an even distribution of the load over ever changing surfaces and elements thereby increasing the life of such elements.

Moreover, because the bearing elements 32 rotate, they apply a rotational force on the freely movable idler member 34 which also causes it to rotate within and relative to the carrier 16. This relative movement also forces the member 34 to present completely new and different portions of its inner surface for engagement with the changing surfaces of the bearing elements 32. The load is thus distributed evenly over the member 34 and results in longer life.

The aforedescribed forced movement of the member 34 relative to the carrier 16 may be enhanced by skewing or directing the raceways in the carrier at an angle to the axis of movement of the workpieces. This is illustrated in FIG. 1 wherein the paths of the raceways guiding the bearing elements 32 for travel are disposed at an angle to the axis of the shaft 12. The same effect can be achieved by connecting all or some of the raceways together in endless paths in spiral form about the idler sleeve 34.

Relative rotation of the workpieces will cause the elements 32 to roll in a circumferential direction. Relative rectilinear motion of the workpieces tends to roll the load bearing elements 32 in a lengthwise direction. However, because the paths of the raceways are skewed or disposed at an angle to the axis of relative motion of the workpieces, the elements 32 will be deflected in their paths by the off-axis forces exerted on them. This will force the elements 32 to continually change their bearing surfaces, cause them to move along the paths to their raceways, and apply a rotative force on the idler member 34 that makes it rotate.

Whether the raceway paths of the elements 32 are disposed at an angle or not, the rolling engagement of the larger set of elements 36 aids in applying a force on the sleeve 34 that causes it to move relative to the raceways. The larger load bearings 36 apply a rotative or linear force on the member 34 that is opposite that of the bearings 32 if the workpieces move in relative opposite directions. Even if the workpieces move relative to each other in the same direction at the same or different speeds, because the bearings 32 and 36 rotate at different speeds, rotation of the sleeve 34 must result.

An interesting feature and additional benefit derived from the invention is that the carrier structure 16 carries no load. It is simply a carrier that directs the movement and retains the relative positions of the bearing elements. As such, it rotates freely within the bearing between the shaft 12 and the outer member 14. Accordingly, the carrier is constructed from inexpensive material that may be molded like plastic. The details of the carrier are not critical and, consequently, it may be manufactured easily. This feature provides a benefit in repair which requires only that a new carrier containing the bearing elements be substituted for an old one when worn.

The embodiment shown in FIGS. 4–7 is generally identified by the numeral 100 with like parts thereof that correspond to the embodiment 10 being identified by like tens digits of numerals in the 100 series. The bearing 100 is similar to the construction of the bearing 10 with the exception that the outer larger ball bearing elements 36 have been replaced by roller bearings 136. To accommodate this change, the carrier structure, generally identified by the numeral 116, has been varied.

The carrier 116, like in the embodiment 10, includes an inner race sleeve 118 and an outer race return sleeve 120. The inner race sleeve 118 has been elongated radially directed through raceway slot 124 that is of the widthwise dimension less than that of the bearing elements 132 at its radial inner surface adjacent the workpiece 12. This will prevent the bearing elements 132 from passing completely through the radial inner portion of the slot and thereby prevent their loss.

Unlike the carrier 16, the outer sleeve 120 of the present carrier 116 is formed as two longitudinally spaced rings each of which is secured directly to the sleeve 118 and positioned at the opposite longitudinal ends of the sleeve 118 of the carrier. The outer opposite end sleeves 120 do not have a raceway slot, as such, but rather, each such sleeve is provided with a plurality of circumferentially spaced guiding recesses 126. The guiding recesses 126 in each of the sleeves 120 may be axially aligned with each other to guidingly receive and position the opposite longitudinal ends of rollable bearing elements 136.

The rollable bearing elements 136 may be elongated rollers, that when positioned in the opposite recesses 126, are fixed in the carrier to rotate therewith and form a part of the sleeve 120 thereof. The bearing elements 136 are thus caged for rotation about the same axis with the bearing elements 132 whose size is materially smaller. By proper alignment of the recesses 126 in the caging sleeves 120, it is possible to accurately locate the larger diameter bearings 136 about the circumference of the carrier 116 such that there are two bearings 136 on opposite adjacent sides of each substantially radially directed raceway for the bearings 132.

In this way, the elongated roller bearings 136 located on opposite sides of each raceway for the bearings 132, forms the radial outer continuation of the raceway slot 124. Thus, two circumferentially spaced but adjacent ones of the bearings 136 complete the raceway path for guiding the movement of the bearing elements 132 in the outer radial portions of their paths. This arrangement eliminates the elongated slots 26 in the embodiment 10 and utilizes the bearings 136 for the same purpose. Not only does the set of bearings 136 function with the set of bearings 132 to space the idler load transfer sleeve 134 from the surfaces of the members 112 and 114, but also the bearings 136 space the sleeve member 134 and load member 114 a sufficient distance from each other to permit the elements 132 to run freely when therebetween in their non-load position.

If desired, the raceway paths for the bearing elements 132 may be skewed or directed at an angle to the axis of rotation of the carrier 116 and the workpiece 12 as described in connection with the embodiment 10. If this is done, the elongated bearings 136 that guide the elements 132 during their movement through the non-load bearing position in their raceway, may also be skewed or angled relative to the axis. This is accomplished simply by so arranging the recesses 126 in the opposite end sleeves 120 so they locate the bearings 136 at the desired angular relationship.

The function of the embodiment 100 is otherwise like that of the embodiment 10. The bearing elements 132 and 136 support the freely rotatable member 134 between the load applying member 12 and 114 while the carrier structure 116 is permitted to rotate within the housing formed by the member 114 and end rings 140. Relative movement of the members 114 and 12 is supported by the sets of bearings 132 and 136 and the idler member 134. Because the carrier 116, the bearings 132 and 136 carried thereby, and the idler member 134 all are capable of relative movement, their bearing surfaces are always changing. This materially lessens the wear on any one surface or part. Furthermore, rotation of the member 134 relative to the sets of bearings 132 and 136, and its transfer of load between its and their changing surfaces results in a better distribution of wear forces that provides a longer-lasting, more stable bearing structure.

It will be clear to those skilled in the bearing art that the present invention enables the use of a greater number of bearing structures that distribute wear while carrying a greater load than comparable prior art structures. Yet, this construction enables the use of inexpensive materials in the carrier. All this is combined with the ability to utilize the present invention for the support of workpieces having relative linear as well as rotary motions.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

What is claimed is:
1. In a bearing, two relatively spaced and relatively movable members,
   a first set of bearing elements,
   a second set of bearing elements,
   carrier means for carrying said sets of bearing elements between the members,
   load transfer means in said bearing spaced between the members,
   said carrier means including at least a raceway in which said first set of bearing elements are guided for movement between one of the members and said load transfer means and between the other member and said load transfer means,
   said first set of bearing elements being in load bearing engagement with the one member and said load transfer means when the same move therebetween in said raceway and being in non-load bearing relation with the other member and said load transfer means when the same move therebetween,
   and said second set of bearing elements being in load bearing engagement with said load transfer means and the other member.
2. In a bearing as in claim 1,
   said carrier means including a plurality of said raceways relatively spaced from each other,
   and said first set of bearing elements being guided for movement in each of said raceways.
3. In a bearing as in claim 2,
   said raceways encircling portions of said load transfer means to guide said first set of bearing elements for movement thereabout and between the same and the two relatively spaced members.
4. In a bearing as in claim 3 for positioning between the two relatively spaced and relatively movable members wherein the members are relatively rotatable,
   said raceways being directed at an acute angle to the axis of rotation of the member.
5. In a bearing as in claim 3,
   said load transfer means being spaced between the members by said first and second sets of bearing elements and being movable relative to said carrier means to present changing portions of its surfaces to which loads are applied by said sets of bearing elements.
6. In a bearing as in claim 1,
   said second set of bearing elements being rollable elements relatively spaced from each other by said carrier and being of a larger dimension than said first set of bearing elements to relatively space said load transfer means and the other member a distance from each other greater than the dimensions of said first set of bearing elements to enable the same to move to their non-load bearing relation between said transfer means and the other member.
7. In a bearing as in claim 6,
   said second set of bearing elements being spheres.
8. In a bearing as in claim 6,
   said second set of bearing elements being elongated rollers cooperable with said carrier means to define a portion of said raceway.
9. In an anti-friction bearing,
   a housing movable relative to a workpiece,
   a plurality of relatively spaced substantially radially directed endless bearing paths defined in said housing,
   said paths each including radially spaced inner and outer portions,
   first bearing elements movable in said plurality of bearing paths alternately between said radially spaced inner and outer portions,
   and a load bearing member in said housing in load bearing engagement with certain ones of said bearing elements and movable relative to said bearing paths in response to the movement of said bearing elements in their bearing paths.
10. In an anti-friction bearing as in claim 9,
   a load supporting member spaced from said load bearing member a distance greater than the dimensions of said first bearing elements to enable said bearing elements to move freely in their paths between said load supporting and load bearing members,
   and second bearing elements being in bearing engagement between said members.

11. An anti-friction bearing adapted to support a shaft for rectilinear and rotational motion comprising
  a carrier including a first sleeve adapted to loosely receive a shaft therethrough and a second sleeve surrounding said first sleeve,
  an intermediate member received between said first and second sleeves,
  an outer sleeve surrounding said second sleeve,
  said first and second sleeves being in a fixed relationship with respect to each other to form said carrier,
  a plurality of endless ball paths defined in said carrier first and second sleeves,
  balls movable in each one of said plurality of endless ball paths,
  at least some of the balls in one portion of said plurality of ball paths defined in said first sleeve being in load bearing holding engagement between the shaft and said intermediate member,
  another portion of each of said plurality of ball paths defined in said second sleeve having a height substantially in excess of the diameter of said balls, whereby balls in the other portion are freely movable and are non-load bearing.

12. An anti-friction bearing as in claim 11,
  in which said plurality of endless ball paths are at an angle to the axis of said first and second sleeves, whereby motion of the shaft relative to said first sleeve causes said carrier and said intermediate member to rotate relative to each other in response to the movement of the balls in the one portion of said ball paths.

13. An anti-friction bearing in accordance with claim 12,
  in which said first and second sleeves of said carrier are fabricated from a plastic material.

14. An anti-friction bearing according to claim 12,
  and movable elements in said carrier rollably engaging between said outer sleeve and said intermediate member.

References Cited

UNITED STATES PATENTS

| | | | |
|---|---|---|---|
| 501,790 | 7/1893 | Jacobs | 308—176 X |
| 580,498 | 4/1897 | Lewis | 308—176 X |
| 2,451,359 | 10/1948 | Schlick. | |
| 2,520,785 | 8/1950 | Schlick. | |
| 2,576,269 | 11/1951 | Thomson | 308—66 |
| 2,599,969 | 6/1952 | Bajulaz | 308—185 X |
| 3,043,634 | 7/1962 | Coley. | |
| 3,061,822 | 10/1962 | Mitchell | 308—176 X |
| 3,086,824 | 4/1963 | Barkley. | |
| 3,097,539 | 7/1963 | Opocensky | 308—176 X |
| 3,025,114 | 3/1962 | Beecher | 308—183 |
| 3,005,665 | 10/1961 | Thomson et al. | 308—6 |

MARTIN P. SCHWADRON, *Primary Examiner.*

FRANK SUSKO, *Assistant Examiner.*